US006889318B1

(12) United States Patent
Wichman

(10) Patent No.: US 6,889,318 B1
(45) Date of Patent: May 3, 2005

(54) INSTRUCTION FUSION FOR DIGITAL SIGNAL PROCESSOR

(75) Inventor: Shannon A. Wichman, McKinney, TX (US)

(73) Assignee: LSI Logic Corporation, Milpitas, CA (US)

(*) Notice: Subject to any disclaimer, the term of this patent is extended or adjusted under 35 U.S.C. 154(b) by 520 days.

(21) Appl. No.: 09/924,178

(22) Filed: Aug. 7, 2001

(51) Int. Cl.⁷ ................................................ G06F 9/45
(52) U.S. Cl. ........................................................ 712/226
(58) Field of Search ................................. 712/24, 226

(56) References Cited

U.S. PATENT DOCUMENTS

RE35,311 E * 8/1996 Vassiliadis et al. ......... 708/521
5,805,852 A * 9/1998 Nakanishi ................... 712/218
6,029,240 A * 2/2000 Blaner et al. ................. 712/23
6,675,376 B2 * 1/2004 Ronen et al. ............... 717/151

* cited by examiner

Primary Examiner—Eric Coleman
(74) Attorney, Agent, or Firm—Conley Rose, P.C.

(57) ABSTRACT

An instruction pipeline for a DSP with fusing logic for combining multiple instructions into a single control word which can be executed by one execution unit. The pipeline fetches a greater number of instructions than the number of execution units to which it can issue instructions. It applies grouping rules to the instructions and also identifies pairs, or larger groups, of instructions which can be combined, or fused, into a single control word which can be executed by one execution unit. Issuance of a fused control word to a single execution unit effectively allows two or more instructions to be executed simultaneously in one execution unit.

41 Claims, 2 Drawing Sheets

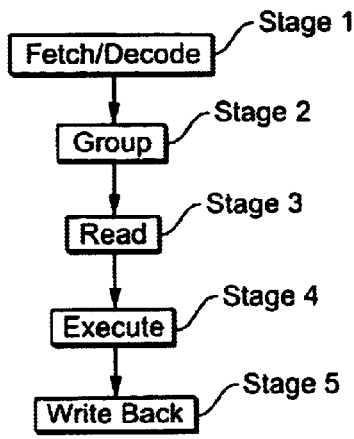
FIG._1
(PRIOR ART)
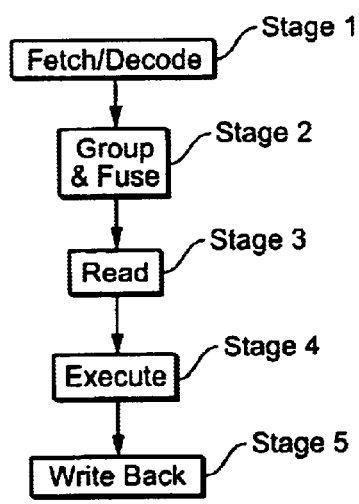
FIG._2
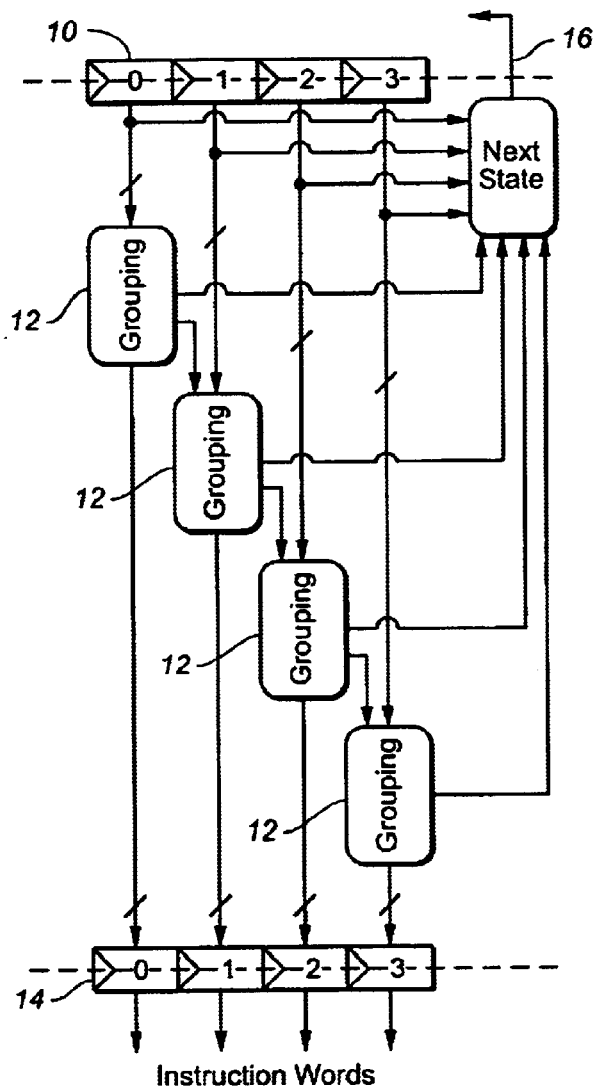
FIG._3
(PRIOR ART)

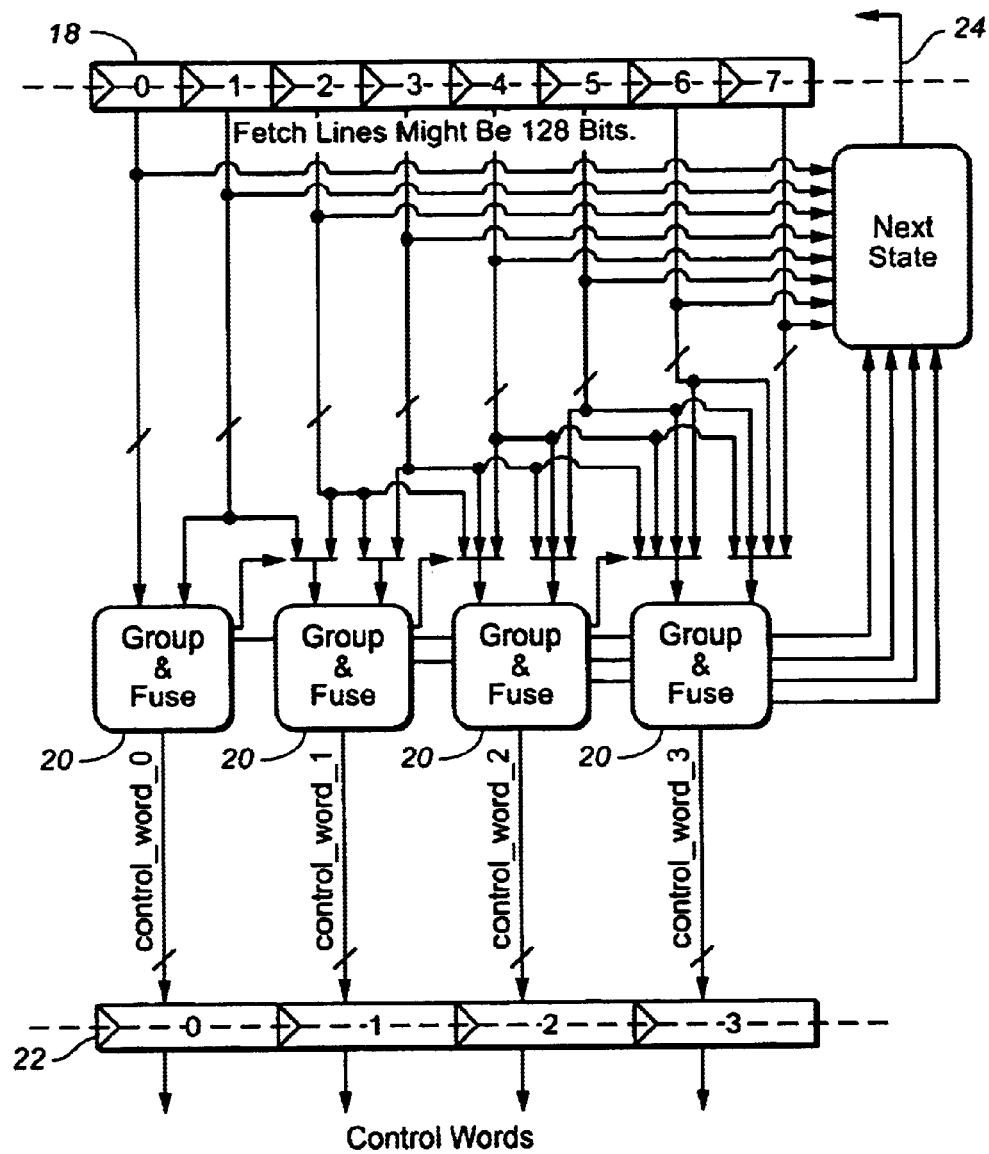
FIG._4

INSTRUCTION FUSION FOR DIGITAL SIGNAL PROCESSOR

BACKGROUND OF THE INVENTION

The present invention relates to digital signal processors having instruction pipelines, and more particularly an instruction pipeline which combines two or more instructions into a single control word which can be executed by one execution unit.

The Digital Signal Processor, DSP, is a specialized microprocessor known for its computational power which can process signal streams with complex mathematical formulas in real time. A DSP is typically ten to fifty times more powerful than typical microprocessor devices such as the microprocessor cores used in ASICs or microcontrollers. Applicant's ZSP DSP has an open architecture which allows it to be easily programmed and used for numerous applications.

DSPs achieve high performance in several ways. They normally include several execution units which may operate in parallel. In a single clock cycle a number of mathematical operations and load and store operations may be executed, or at least partially executed in the case of operations which require more than one clock cycle to complete. Use of an instruction pipeline is also a known method of increasing the effective speed of operation of a DSP. A pipeline separates an operation into multiple steps which are performed at separate stages of the pipeline. Each stage may be performing a part or subpart of a different operation, effectively allowing the processor to perform multiple operations in parallel. The applicant's ZSP DSP has four execution units, two for mathematical functions and two for loading and storing data. In a DSP having four execution units, the instruction pipeline may act like four pipelines. The pipeline can issue up to four instructions at the same time, one for each execution unit. However, the pipeline must confirm that instructions which are issued at the same time do not conflict, that is that they do not violate grouping or execution rules. For example, if instruction A is to operate on the result of instruction B, then instruction A cannot be executed until after instruction B. In that case, instruction A cannot be issued at the same time as instruction B. If two instructions require loading of data into the same register, they cannot be executed in the same clock cycle. A grouping stage is provided in such pipelines to compare multiple instructions to detect and prevent such conflicts. The grouping stage issues sets of instructions which can be properly executed at the same time. For maximum efficiency, a pipeline will simultaneously issue instructions to all execution units which are ready to accept a new instruction.

DSPs are commonly programmed with RISC, Reduced Instruction Set Computer, instructions. Typically these instructions have a limited fixed length, e.g. sixteen bits. While the limited length helps to simplify the programming process, the limited instruction length can also cause conflicts and produce inefficiency. For example loading of immediate data into a register may require two instructions because of instruction limitations. A single execution unit could perform the process if it is properly instructed.

SUMMARY OF THE INVENTION

In accordance with the present invention, an instruction pipeline in a DSP includes logic for combining multiple instructions into a more complex control word which may be executed by a single execution unit. The pipeline fetches more instructions than the number of execution units. It examines the set of instructions for multiple instructions which can be combined into a single control word and coupled through a single issue slot to a single execution unit for processing. When multiple instructions are fused into a single control word, the DSP is able to simultaneously execute more than one instruction in one execution unit.

BRIEF DESCRIPTION OF THE DRAWINGS

FIG. 1 is an illustration of a prior art ZSP pipeline;

FIG. 2 is an illustration of an improved pipeline according to this disclosure;

FIG. 3 is an illustration of a prior art ZSP instruction grouping pipeline stage; and FIG. 4 is an illustration of an improved instruction grouping and fusing pipeline stage according to this disclosure.

DETAILED DESCRIPTION OF EMBODIMENTS

With reference to FIG. 1 there is illustrated a five stage control pipeline as used in the ZSP digital signal processor. In Stage 1 the processor fetches instructions from memory and decodes them. In the ZSP DSP, four instructions are fetched at each clock cycle. The instructions are typical RISC instructions which are limited to sixteen bits. In Stage 2, the processor checks the four instructions with grouping and dependency rules and issues valid instructions to the pipeline. Valid instructions are instructions which can be processed in different execution units simultaneously without conflicts as discussed in the background section above. Since the processor examines four instructions and has four execution units, it can issue and execute up to four instructions on each clock cycle. In Stage 3, the processor reads operands from the data unit as needed for the valid instructions issued in Stage 2. In Stage 4 an execution unit executes the instructions which were issued in Stage 2 and writes the results to a general purpose register or sends them to the data unit. In Stage 5 the data unit writes results to memory.

With references to FIG. 2, an improved DSP pipeline is illustrated. This is also a five stage pipeline. In Stage 1 the processor fetches instructions from memory and decodes them. In this case, the processor fetches at least five instructions, i.e. one more than the number of execution units, and preferably fetches eight instructions. The instructions are typical RISC type of instructions, normally limited to sixteen bits.

In Stage 2, the processor checks the decoded instructions with grouping and dependency rules to identify instructions which can be executed simultaneously. It also checks the instructions to identify pairs of instructions which can be fused. The term "fused" or "fusing" of instructions is used herein to mean combining multiple "standard" instructions into a single control word which can be coupled through an issue slot to one execution unit for processing. The fusing may be performed with mapping logic which recognizes pairs which can be fused and produces a control word which instructs an execution unit to perform, as one operation, the two operations called for by the pair of instructions.

Note that grouping and fusing are performed in a single stage, because the processes are interdependent. For example, a pair of instructions may be identified as conflicting under the grouping rules, e.g. both instructions would modify the same register, but the pair can be combined in a single control word so that they can be executed at the same time. Even if a pair of instructions passes the grouping rules and could be executed in two execution units during the same execution cycle, it would be far more efficient to combine them into a single control word for execution in one execution unit during one execution cycle.

In this embodiment, fetching of eight instructions is preferred because there are four issue slots and it is expected that normally two instructions may be fused into one. In the ideal case where each of the eight instructions can be fused with another of the eight, the result would be four control words which could be issued through four issue slots for simultaneous execution by four execution units. When this ideal situation arises, the processor is able to process eight RISC instructions with four execution units at the same time and possibly in a single clock cycle. In some cases, it may be possible to fuse more than two instructions into a single control word. For this and other reasons, it may be desirable to expand the design to fetch and inspect more than eight instructions at a time.

When the Stage 2 group and fuse operation is completed, the processor issues up to four control words, which may contain or perform the operations of up to eight valid instructions, to the pipeline through its four issue slots. Stages 3, 4, and 5 then proceed as in the prior art pipeline described above. The only difference is that the execution units are issued control words, each of which represents control information of one or more standard instructions. This allows each execution unit to perform operations which otherwise would have to be split into two or more standard instructions, which would use two or more of the four issue slots and may have to be executed on consecutive clock cycles instead of simultaneously. This provides a substantial savings in processing overhead.

With reference to FIG. 3, a flow diagram of the grouping stage of the FIG. 1 pipeline is illustrated. The four instructions which are fetched in Stage 1 are loaded into a register 10. Grouping logic 12 examines the four instructions to determine which ones can be executed simultaneously. Those which can be are coupled to a second register 14 which forms four instruction issue slots. If there are conflicts between the four instructions, only one, two or three of them can be issued, and the remaining instructions must be fed back at 16 to the fetch stage to be included in the set of four instructions to be examined on the next clock cycle. The instruction words in issue slots 14 are then used in the following stages of the pipeline to read data, execute the operation and write results back to memory if necessary.

With reference to FIG. 4, a flow diagram of the grouping and fusing stage of the FIG. 2 pipeline is illustrated. In this embodiment, eight instructions are fetched in Stage 1, decoded and loaded into a register 18. Group and fuse logic 20 examines the eight instructions to both find sets of instructions which can be combined into single control words and to identify any conflicts which would prevent grouping of the instructions for simultaneous execution. The results of the process are loaded into a register 22 which forms four issue slots for providing control words for the following pipeline stages. For instructions which are valid, but cannot be fused, the issue slots may contain a control word representing the control information of a single standard decoded instruction. For sets of instructions which were fused, the issue slot may contain a control word representing the control information of more than one standard instruction. Alternatively, the issue slots for fused instructions may actually contain the two instructions or pointers to the two instructions which will be used by the execution unit to map to the appropriate microcode to execute both instructions.

As in the FIG. 3 system, up to four of the issue slots may be loaded with control words, but in case of conflicts, only one, two or three may be loaded with control words. In the ideal case, all eight instructions may be combined into four control words which can be issued and executed simultaneously. For instructions which cannot be fused and issued due to conflicts, they are returned to Stage 1 at 24 for placement in the next set of eight instructions to be fetched and processed in the group and fuse stage.

In the following paragraphs, examples of pairs of instructions which can be fused as described herein are provided. Each pair forms a single logical operation, which in the prior art must be split into two instructions due to limitations of standard RISC programming.

A first example is the process of loading sixteen bit immediate data into a general purpose register or a configuration register. In the prior art, a programmer is required to split this operation into two instructions, movh Rx, OxAB and movl OxCD, each of which moves half of the data, i.e. eight bits, to the register. The loading must be done in two steps of eight bits of data due to the limitation on the length of instructions, which in this case is the same as the length of the data to be moved. The instructions cannot be executed at the same time because two different execution units would be accessing and modifying the same register simultaneously, which is not allowed. These two instructions may be fused into the single instruction word, mov Rx, OXABCD, which a single execution unit can execute in one execution cycle.

Another example is a load with update instruction, LDU Rx, Ry, 1, followed by an add immediate instruction, ADD Rx,0x4. The first instruction moves the value in register Rx to register Ry and then adds one to the value in Ry. The second instruction adds four to the value stored in register Rx. Since both instructions would modify register Rx, they cannot be performed by two execution units at the same time. The two instructions can be fused into the control word LDU Rx, Ry, 0x1, 0x4, which can be performed by one execution unit and achieves the same result as the two original instructions.

A third example is two consecutive add immediate instructions, ADD Rx,0x7, and ADD Rx,0x7. As in the first example, the standard sixteen bit instruction is not long enough to hold both immediate values and the rest of the instruction. Both instructions modify the same register and therefore could not be performed at the same time by two different execution units. But the same result is achieved by issuing the control word ADD Rx, 0x7, 0x7 to one execution unit.

A fourth example is a conditional multiply and accumulate to accumulator A instruction which is produced by the combination of the two instructions mac.a rX, ry and cexe cond. This conditional execution can be performed with a single instruction mac.a rX, rY only if cond==true.

While the present invention has been illustrated and described in terms of particular apparatus and methods of use, it is apparent that equivalent parts may be substituted of those shown and other changes can be made within the scope of the present invention as defined by the appended claims.

What is claimed is:

1. A method for operating a pipeline in a processor comprising:

fetching a number of unfused instructions, said number of fetched unfused instructions being greater than the number of execution units in a processor; and combining a plurality of the fetched unfused instructions into a control word which can be processed by one execution unit;

wherein said processor has four execution units and said pipeline fetches at least five unfused instructions.

2. The method according to claim 1 wherein:
two of the fetched unfused instructions are combined into the control word.

3. The method according to claim 1 further comprising; issuing the control word to an execution unit.

4. The method according to claim 1 wherein; said pipeline fetches eight unfused instructions.

5. The method according to claim 1 wherein; said pipeline checks instructions for conflicts and issues valid control words to said execution units.

6. The method of claim 5 wherein; said pipeline issues control words to all four execution units.

7. The method according to claim 1, wherein combining a plurality of unfused instructions into a control word which can be processed by one execution unit further comprises:
combining, into said control word, a plurality of non-conflicting unfused instructions capable of being executed simultaneously.

8. The method according to claim 1, wherein combining a plurality of unfused instructions into a control word which can be processed by one execution unit further comprises:
combining, into said control word, a plurality of conflicting unfused instructions incapable of being executed simultaneously.

9. The method according to claim 1, wherein combining a plurality of unfused instructions into a control word which can be processed by one execution unit further comprises:
combining, into said control word, a plurality of unfused instructions, each of which modifies a common register.

10. The method according to claim 1, and further comprising:
returning unfused instructions which cannot be combined and processed by one execution unit;
wherein said returned unfused instructions are included in a next fetching of a number of unfused instructions greater than the number of execution units in a processor.

11. A processor comprising:
an instruction pipeline having a first stage which fetches and decodes a number of unfused instructions, the number of unfused instructions fetched and decoded by said first stage being greater than the number of execution units in said processor, and
fusing logic in a second stage of said pipeline combining a plurality of said decoded unfused instructions into a control word which can be executed by one execution unit.

12. The processor of claim 11 further including;
an issue slot in said second stage for coupling said control word to following stages of said pipeline.

13. The processor of claim 12 further including;
an execution unit in a third stage of said pipeline receiving and executing the control word.

14. The processor of claim 11 wherein;
said processor comprises four execution units and said first pipeline stage fetches at least five unfused instructions.

15. The processor of claim 14 wherein;
said first pipeline stage fetches eight unfused instructions.

16. The processor of claim 11 further comprising;
grouping logic in said second stage checking said unfused instructions for conflicts and issuing only valid control words.

17. The processor of claim 16 wherein;
said processor comprises four issue slots receiving valid control words.

18. The processor of claim 17 wherein;
said processor issues control words to all four execution units in one clock cycle.

19. The processor of claim 17 wherein said processor comprises;
four execution units, each receiving control words from one of said issue slots.

20. The processor of claim 11, wherein said fusing logic in said second stage of said pipeline further comprises grouping and fusing logic for combining, into said control word, a plurality of non-conflicting unfused instructions capable of being executed simultaneously.

21. The processor of claim 11, wherein said fusing logic in said second stage of said pipeline further comprises grouping and fusing logic for combining, into said control word, a plurality of conflicting unfused instructions incapable of being executed simultaneously.

22. The processor of claim 11, wherein said fusing logic in said second stage of said pipeline further comprises grouping and fusing logic for combining, into said control word, a plurality of unfused instructions, each of which modifies a common register.

23. A system for coupling instructions from memory to execution units in a processor comprising;
fetching means for fetching and decoding a number of unfused instructions, the number of unfused instructions fetched and decoded by said fetching means being greater than the number of execution units in said processor, and
fusing means for combining a plurality of said fetched and decoded unfused instructions into a control word which can be executed by one execution unit.

24. The system of claim 23 further comprising;
grouping means for checking said fetched and decoded unfused instructions for conflicts which would prevent simultaneous execution of said instructions.

25. The system of claim 24 further comprising;
issue means for issuing control words which may be executed simultaneously to a plurality of said execution units.

26. The system of claim 25 wherein;
said processor comprises four execution units and
said issue means includes slots for issuing a control word to each execution unit.

27. The system of claim 26 wherein;
said fetching means fetches eight unfused instructions simultaneously.

28. The system of claim 23, wherein said fusing means further comprises:
grouping and fusing means for combining, into said control word, a plurality of non-conflicting unfused instructions capable of being executed simultaneously.

29. The system of claim 23, wherein said fusing means further comprises:
grouping and fusing means for combining, into said control word, a plurality of conflicting unfused instructions incapable of being executed simultaneously.

30. The system of claim 23, wherein said fusing means further comprises:
grouping and fusing means for combining, into said control word, a plurality of unfused instructions, each of which modifies a common register.

31. The system of claim 23, and further comprising:

return means for returning unfusible instructions to said memory;

said fetching means fetching and decoding said returned unfusible instructions in a next fetch from said memory.

32. A method for operating a pipeline in a processor comprising:

fetching a number of unfused instructions, said number of fetched unfused instructions being greater than the number of execution units in a processor;

combining a plurality of the fetched unfused instructions into a control word which can be processed by one execution unit; and returning unfused instructions which cannot be combined and processed by one execution unit;

wherein said returned unfused instructions are included in a next fetching of a number of unfused instructions greater than the number of execution units in a processor.

33. The method according to claim 32 wherein:

two of the fetched unfused instructions are combined into the control word.

34. The method according to claim 32 further comprising:

issuing the control word to an execution unit.

35. The method according to claim 32 wherein:

said processor has four execution units and said pipeline fetches at least five unfused instructions.

36. The method according to claim 35 wherein:

said pipeline fetches eight unfused instructions.

37. The method according to claim 35 wherein:

said pipeline checks instructions for conflicts and issues valid control words to said execution units.

38. The method according to claim 37 wherein:

said pipeline issues control words to all four execution units.

39. The method according to claim 32, wherein combining a plurality of unfused instructions into a control word which can be processed by one execution unit further comprises:

combining, into said control word, a plurality of non-conflicting unfused instructions capable of being executed simultaneously.

40. The method according to claim 32, wherein combining a plurality of unfused instructions into a control word which can be processed by one execution unit further comprises:

combining, into said control word, a plurality of conflicting unfused instructions incapable of being executed simultaneously.

41. The method according to claim 32, wherein combining a plurality of unfused instructions into a control word which can be processed by one execution unit further comprises:

combining, into said control word, a plurality of unfused instructions, each of which modifies a common register.

* * * * *